Aug. 22, 1961  V. W. BLANCHARD  2,997,388
LIPPMANN EMULSION MASKING PROCESS
Filed July 17, 1957  6 Sheets-Sheet 1

*INVENTOR*
VERNON WILLIAM BLANCHARD

BY *Lynn Barratt Morris*
*ATTORNEY*

Aug. 22, 1961  V. W. BLANCHARD  2,997,388
LIPPMANN EMULSION MASKING PROCESS
Filed July 17, 1957  6 Sheets-Sheet 2

Green-sensitive silver chloride + magenta color former.
Lippmann emulsion + magenta and yellow color formers.
Red-sensitive silver chloride + cyan color former
Gelatin sublayer.
Film base.

INVENTOR
VERNON WILLIAM BLANCHARD

BY *[signature]*

ATTORNEY

FIG. 9
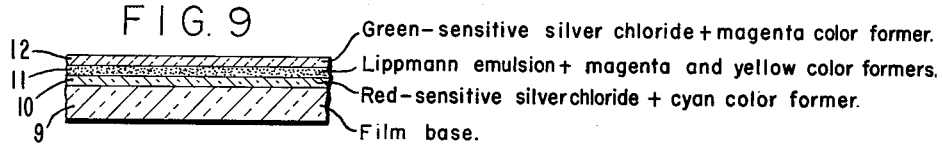
- 12 — Green-sensitive silver chloride + magenta color former.
- 11 — Lippmann emulsion + magenta and yellow color formers.
- 10 — Red-sensitive silver chloride + cyan color former.
- 9 — Film base.
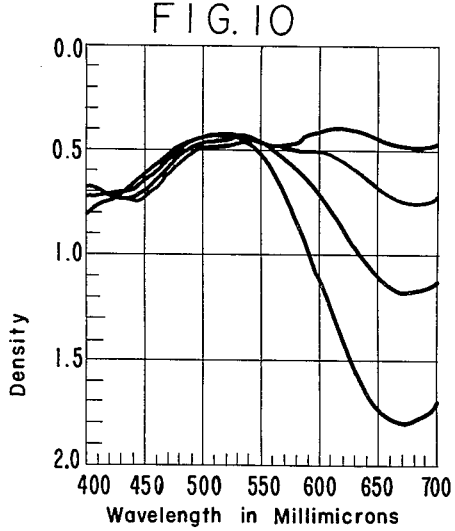
FIG. 10
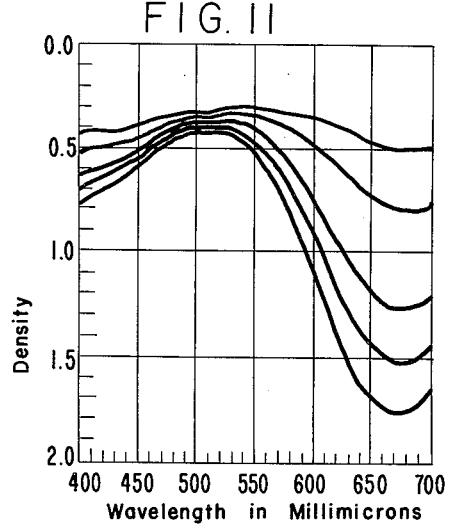
FIG. 11
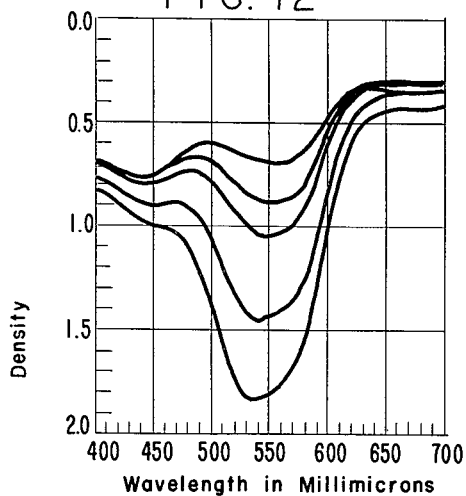
FIG. 12
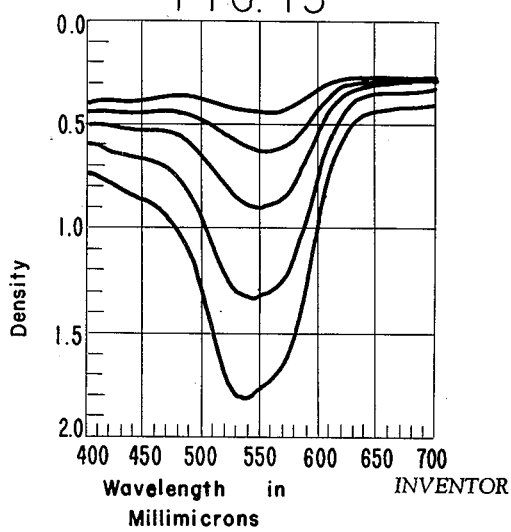
FIG. 13
INVENTOR
VERNON WILLIAM BLANCHARD
BY Lynn Barratt Morris
ATTORNEY Aug. 22, 1961  V. W. BLANCHARD  2,997,388
LIPPMANN EMULSION MASKING PROCESS
Filed July 17, 1957  6 Sheets-Sheet 4
FIG. 14
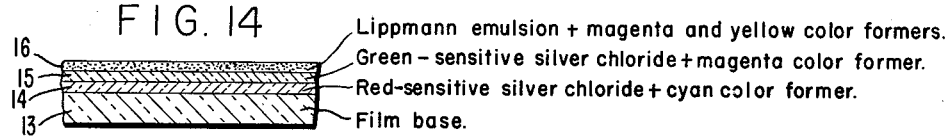
- 16 — Lippmann emulsion + magenta and yellow color formers.
- 15 — Green-sensitive silver chloride + magenta color former.
- 14 — Red-sensitive silver chloride + cyan color former.
- 13 — Film base.
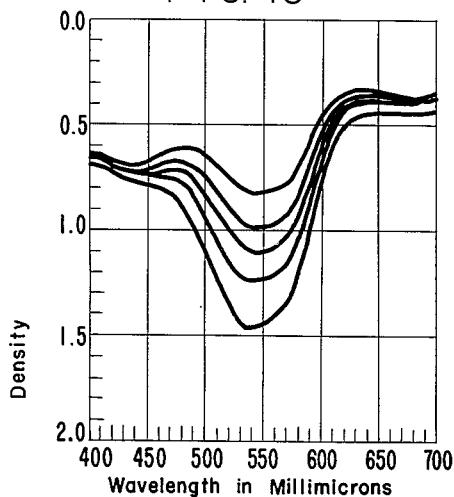
FIG. 15
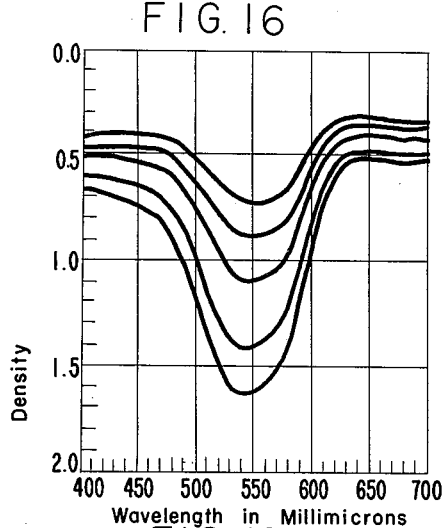
FIG. 16
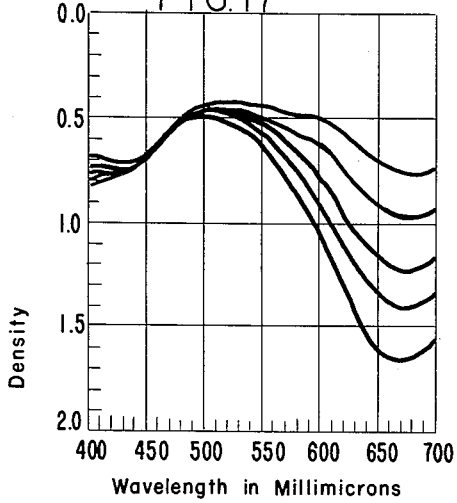
FIG. 17
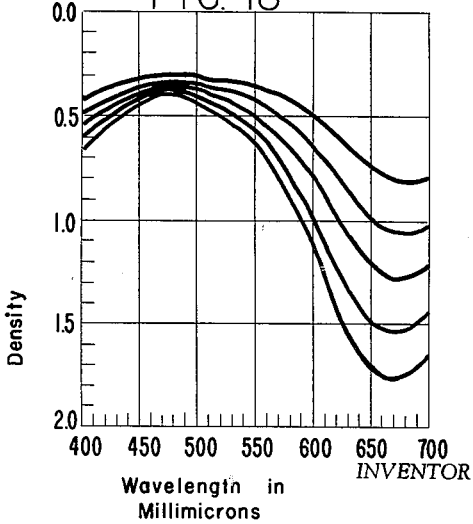
FIG. 18
INVENTOR
VERNON WILLIAM BLANCHARD
BY *Lynn Barratt Morris*
ATTORNEY

FIG. 19
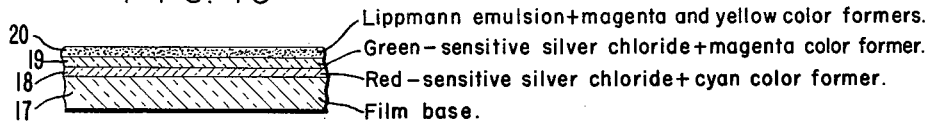
- Lippmann emulsion + magenta and yellow color formers.
- Green-sensitive silver chloride + magenta color former.
- Red-sensitive silver chloride + cyan color former.
- Film base.
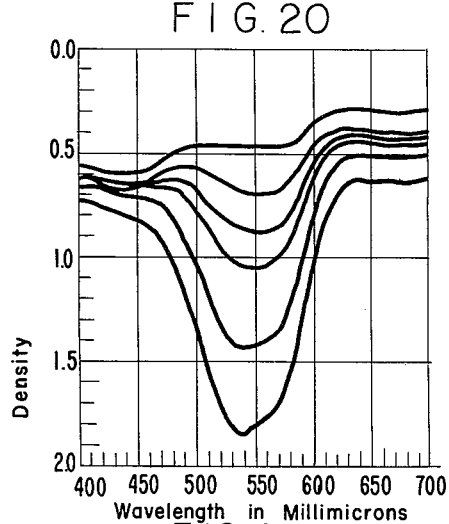
FIG. 20
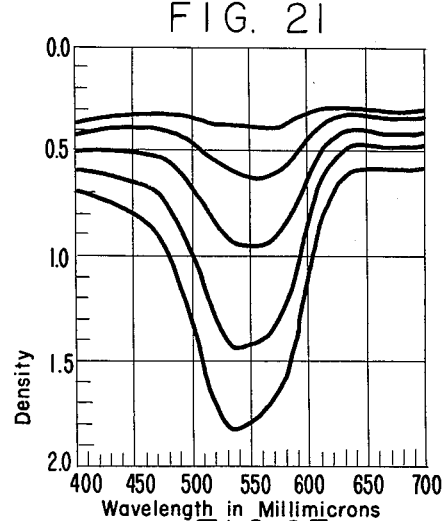
FIG. 21
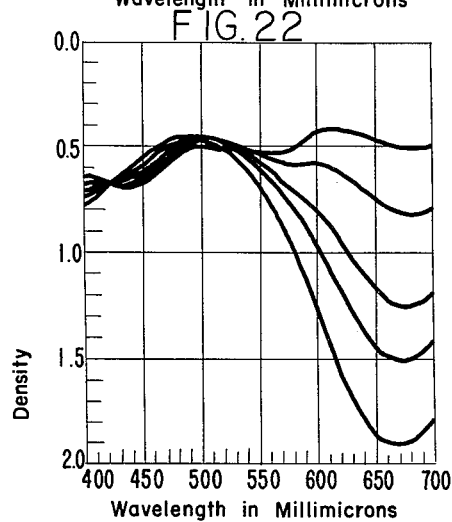
FIG. 22
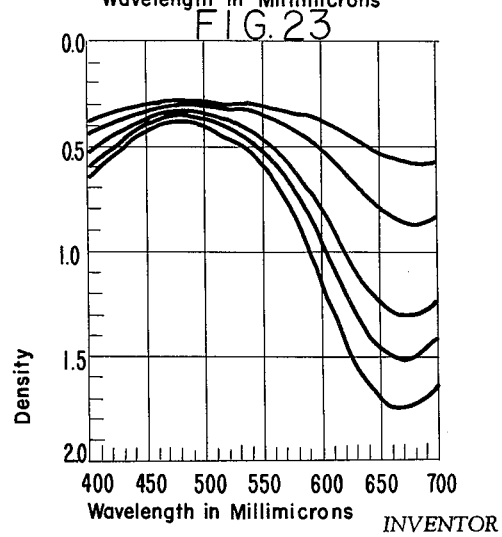
FIG. 23

Aug. 22, 1961     V. W. BLANCHARD     2,997,388
LIPPMANN EMULSION MASKING PROCESS
Filed July 17, 1957     6 Sheets-Sheet 6
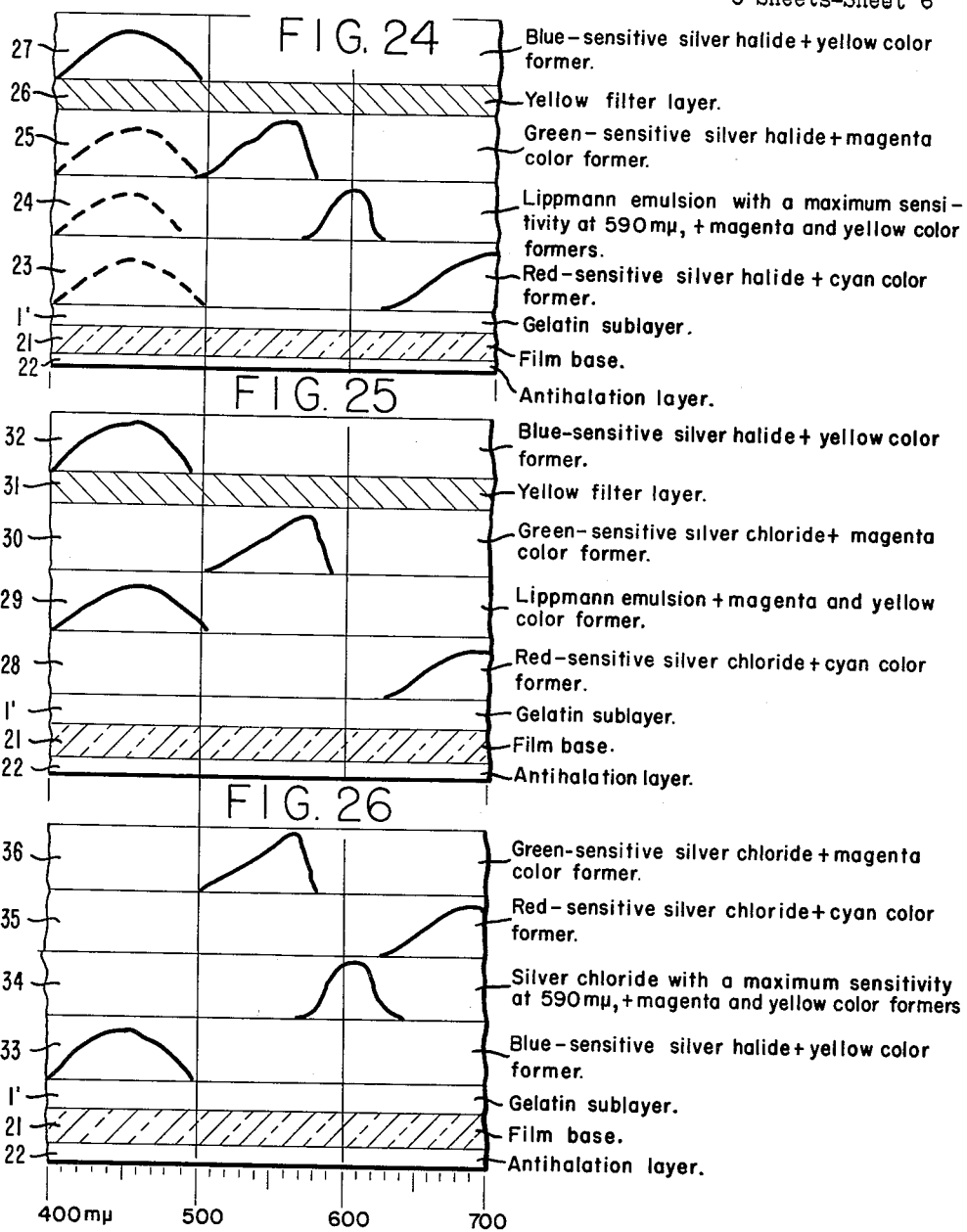
INVENTOR
VERNON WILLIAM BLANCHARD
BY Lynn Barrett Morris
ATTORNEY 2,997,388
Patented Aug. 22, 1961

2,997,388
LIPPMANN EMULSION MASKING PROCESS
Vernon William Blanchard, New Brunswick, N.J., assignor to E. I. du Pont de Nemours and Company, Wilmington, Del., a corporation of Delaware
Filed July 17, 1957, Ser. No. 672,495
5 Claims. (Cl. 96—7)

This invention relates to color photography and more particularly to a process for the color correction of subtractive color images and to duplicating negative and master positive photographic film elements therefor.

An object of this invention is to provide a new process for the color correction of subtractive color images in duplicating negative and master positive films. Another object is to provide such a process which is simple and gives uniform dependable results. Yet another object is to provide such a process which utilizes commercially available apparatus and equipment. A further object is to provide new multilayer photographic color films for subtractive color photography using the negative-positive system. A still further object is to provide such films which have an integral masking or color-correcting layer or layers. Still other objects will be apparent from the following description of the invention.

The novel multilayer photographic color films of this invention comprise a base, at least one water-permeable colloid silver halide emulsion record layer which is sensitive primarily to visible radiation in a primary color region of the visible spectrum and contains a non-diffusing color former capable on development of the exposed silver halide of forming a subtractive dye, and at least one auxiliary silver halide emulsion layer, said auxiliary layer being primarily sensitive to light in the visible region of the spectrum and containing at least one non-diffusing color former so that the layer is capable on development of exposed silver halide of forming an orange dye. Thus, the layer may contain a single orange color former or a mixture of magenta and yellow color formers.

More particularly, the photographic films of the invention comprise a transparent film base bearing three light-sensitive silver halide primary color record layers which are so disposed and optically sensitized that each sensitive layer is essentially light-responsive to a different primary color region of the visible spectrum and contains a non-diffusing color former capable of forming, during development with a color developing agent, a subtractive dye essentially complementary in color to one of said primary colors, at least one such subtractive dye having unwanted absorption in another primary color region of the spectrum, and at least one coactive auxiliary light-sensitive silver halide layer containing at least one non-diffusing color former so that the layer is capable upon development of silver halide of forming a dye image having its principal absorption in the regions of unwanted absorption of the dye in the record layer to be corrected, the disposition of the auxiliary layer with respect to the color record layer being such that each of the four light-sensitive layers can be exposed independently of any other layers by a selected spectral band in the visible spectrum.

In the preferred aspect of the invention, the multilayer photographic color films comprise a transparent film base bearing three light-sensitive silver halide emulsion layers and a yellow filter stratum which are so disposed and sensitized that each layer is essentially sensitive to a different primary color region of the visible spectrum and contains a non-diffusing color former capable of yielding a subtractive color dye upon chromogenic development in the presence of a primary aromatic amine color developing agent, and in contact with at least one of the aforesaid emulsion layers an auxiliary silver halide emulsion layer that is primarily sensitive to light of a region of the visible spectrum which will not expose any record layer to be color corrected, i.e., said auxiliary layer containing at least one non-diffusing color former so that the layer is capable upon development of exposed silver of forming a dye which will correct for the unwanted absorptions of dye formed in the record layer to be corrected.

In the foregoing multilayer color films for 3-color photography, it is not always necessary to have a yellow filter layer present. When a yellow filter stratum is used, it is uually (a) either in the outermost silver halide emulsion layer or (b) in a layer beneath said layer so that blue light is absorbed and it will not affect the layers disposed behind the outermost layer i.e., the yellow filter stratum is contiguous with the outermost silver halide emulsion layer. These films may also have an antihalation stratum beneath the light-sensitive layer. It may be in or on either surface of the film base.

The novel processes of color correction of this invention are carried out, after exposure of an aforedescribed multilayer color film to a multicolor type of object field, (a) by color developing the exposed film to form a silver image record and a subtractive dye image simultaneously and in situ with the silver image, (b) prior to the completion of the color development step exposing the multilayer film element to light to which the auxiliary layer is sensitive and continuing the color development step to completion whereby an orange dye masking image is formed in said auxiliary layer and the subtractive color dye images are completed in the other emulsion layers, and (c) removing the silver and silver salts from the film element.

A result of the color development steps (a) and (b) is that a low contrast orange color positive image of the partially color developed negative record color images is printed or formed in the auxiliary layer. This orange image compensates for the undesirable absorption characteristics of the negative color dye images in the primary color record layers.

In further exemplification of the invention, an auxiliary emulsion coated under a green-sensitive emulsion containing a cyan color former can be sensitized to a region of the spectrum to which the green-sensitive emulsion is relatively insensitive. This auxiliary emulsion may contain an orange color former or a combination of yellow and magenta color formers. After partial development of the exposed green-sensitive layer, the element is exposed to radiations which will expose the auxiliary layer through the partially developed image of the green-sensitive layer, said green sensitive layer being insensitive to said radiation. Upon continuation of development to completion it will be found that a low contrast positive orange image of the partially developed cyan image of the green sensitive layer will be printed in the auxiliary layer. This orange image will correct for or cancel out the undesirable absorption in the blue and green regions of the cyan image, both of which cyan dye is ideally supposed to transmit.

The silver halide emulsion used in the auxiliary layer should be of the finest grain, and a preferred type is the transparent, extremely fine-grain emulsion known as the Lippmann emulsion. Although such emulsions are normally slow to visible light, adequate speeds in regions of the spectrum where record emulsion layers to be color-corrected are not exposed can be readily obtained by dye sensitization. A suitable sensitizing dye is 7-chloro-N,N'-diethylcyanine iodide which dye sensitizes in the region from approximately 540–600 m$\mu$ with a peak about 590 m$\mu$.

No sensitizer is required for Lippmann type blue-sensitive auxiliary layers. Natural sensitivity of emulsion is utilized. In the event a chloride emulsion is used as the auxiliary masking layer, such an emulsion can be sensitized as above, or to the blue region of the spectrum by N,N'-diethyl oxa-thia-cyanine p-toluene sulfonate.

In the accompanying drawings which constitute a part of this specification,

FIG. 9 is a schematic sectional view of the film of Example III.

FIG. 10 is a graph containing spectrophotometric curves of the masked cyan dye image of the film of Example III.

FIG. 11 is a graph containing spectrophotometric curves of the unmasked cyan dye image of the film of Example III.

FIG. 12 is a graph containing spectrophotometric curves of the masked magenta dye image of the film of Example III.

FIG. 13 is a graph containing spectrophotometric curves of the unmasked magenta image of the film of Example III.

FIG. 14 is a schematic sectional view of the film of Example IV.

FIG. 15 is a graph containing spectrophotometric curves of the masked magenta dye image of the film of Example IV.

FIG. 16 is a graph containing spectrophotometric curves of the unmasked magenta dye image of the film of Example IV.

FIG. 17 is a graph containing spectrophotometric curves of the masked cyan dye image of the film of Example IV.

FIG. 18 is a graph containing spectrophotometric curves of the unmasked cyan dye image of the film of Example IV.

FIG. 19 is a schematic sectional view of the film of Example V.

FIG. 20 is a graph containing spectrophotometric curves of the masked magenta dye image of the film of Example V.

FIG. 21 is a graph containing spectrophotometric curves of the unmasked magenta dye image of the film of Example V.

FIG. 22 is a graph containing spectrophotometric curves of the masked cyan dye image of the film of Example V.

FIG. 23 is a graph containing spectrophotometric curves of the unmasked cyan dye image of the film of Example V.

FIG. 24 is a schematic sectional view of an alternative film element including approximate sensitivity peaks of the light-sensitive layers.

FIG. 25 is a schematic sectional view of another alternative film element with approximate sensitivity peaks.

FIG. 26 is a schematic sectional view of a further alternative film element, including approximate sensitivity peaks.

The invention will be further illustrated but is not intended to be limited by the following examples in which the emulsions were prepared, coated and the elements were maintained, prior to sensitometric exposure or use, under conditions such that no significant actinic light was allowed to fall upon them.

*Example I*

Figure 1:
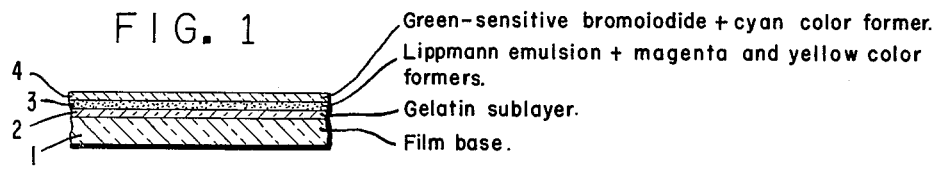
FIG. 1 is a schematic sectional view of the film of Example I.

A photographic film as shown in FIG. 1 comprises a transparent film base 1, bearing in order a gelatin sublayer 2, a Lippmann type gelatino-silver bromide emulsion layer 3 having maximum sensitivity at 590 m$\mu$ containing the magenta color former, 2-cyanoacetyl-3-phenyl-5-benzofuraldehyde polyvinyl acetal (U.S. Patent 2,680,792), and the yellow color former, m-benzoylacetamidobenzaldehyde polyvinyl acetal (U.S. Patent 2,464,597), and a green-sensitive gelatino-silver iodobromide type emulsion layer 4 containing the cyan color former, m-(3-methyl salicylamido)benzaldehyde polyvinyl acetal (U.S. Patent 2,489,655). The green sensitivity of the record emulsion is from approximately 480 to 570 m$\mu$ with a sensitivity at about 560 m$\mu$. A sample strip of film was exposed for 1/10 of a second to green light in a color sensitometer by exposing it through a step wedge with an 0.15 density increment per step with 1000 watt incandescent lamp using a Corning 3486 and Jena BG–18 filters. The resulting exposed film strip was developed for 1½ minutes in a color developer of the following composition:

| | Grams |
|---|---|
| p-Amino diethylaniline·HCl | 2.5 |
| Sodium sulfite (anhydrous) | 10.0 |
| Sodium carbonate (monohydrate) | 47.0 |
| Potassium bromide | 2.0 |
| Water to make 1.0 liter. | |

The film strip was then exposed for 20 seconds from the emulsion side to a sodium lamp (General Electric, Sodium-Lab-Arc lamp, Code No. 160–6A11X1) placed at a distance of 10 feet from the strip. Development was then continued for 6 minutes. The film was washed in water for 30 seconds and fixed for 5 minutes in a solution of the following composition:

| | | |
|---|---|---|
| Sodium thiosulfate (anhydrous) | grams | 153 |
| Sodium sulfide (anhydrous) | do | 15 |
| Borax | do | 18 |
| Acetic acid (glacial) | ml | 12 |
| Potassium alum | grams | 20 |
| Water to make 1.0 liter. | | |

The film strip was washed in water for 5 minutes and then bleached for 5 minutes in a solution of the following composition:

| | | |
|---|---|---|
| Potassium bromide | grams | 20 |
| Potassium bichromate | do | 10 |
| Potassium alum | do | 40 |
| Acetic acid (glacial) | ml | 60 |
| Ammonium bromide | grams | 20 |
| Ammonium hydroxide (conc.) | ml | 22.5 |
| Water to make 1.0 liter. | | |

The strip was washed in water for 2 minutes and fixed in a solution of the following composition:

| | | |
|---|---|---|
| Sodium thiosulfate (anhydrous) | grams | 128 |
| Water to make 1.0 liter. | | |

The film strip was washed in water for 10 minutes and dried.

Figure 2:
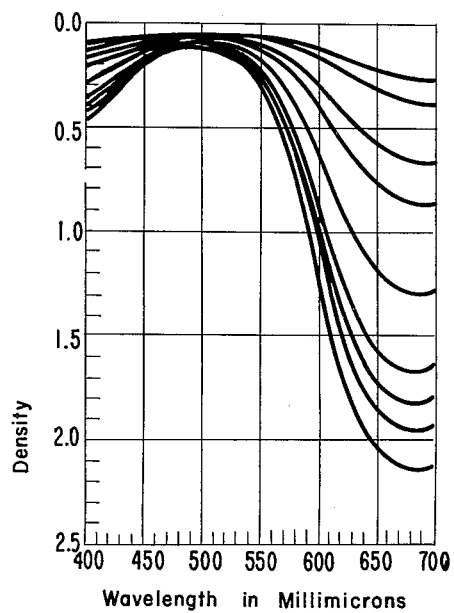
FIG. 2 is a graph containing spectrophotometric curves of the unmasked cyan dye image of the film of Example I.
Figure 3:
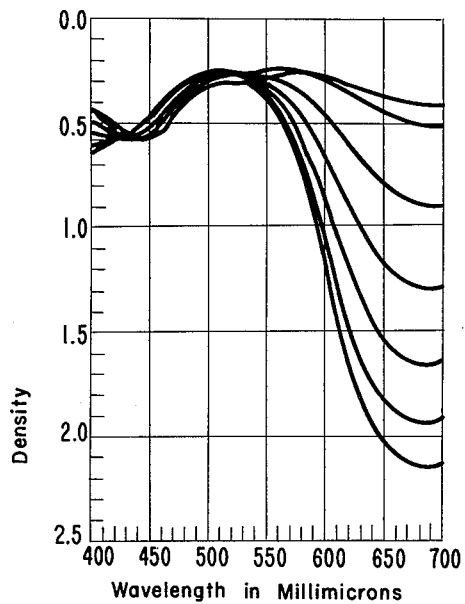
FIG. 3 is a graph containing spectrophotometric curves of the masked cyan dye image of the film of Example I.

A control sensitometric strip of film containing a green-sensitive emulsion layer containing the same cyan color former but not having the above-described masking layer between the green sensitive layer and the support was exposed and processed in like manner. After drying, the strips of the two types of film were placed in a General Electric recording spectrophotometer and the absorption curves of the cyan layers determined. FIGS. 2 and 3 of the drawings show the curves for the unmasked and the masked cyan layers. It is to be noted that almost complete correction is obtained for the unwanted blue and green absorptions of the cyan dye, that is, there is almost no variation of blue and green density (at 435 and 535 millimicrons) with concentration of cyan dye as there is in the case of the uncorrected image.

*Example II*

Figure 4:
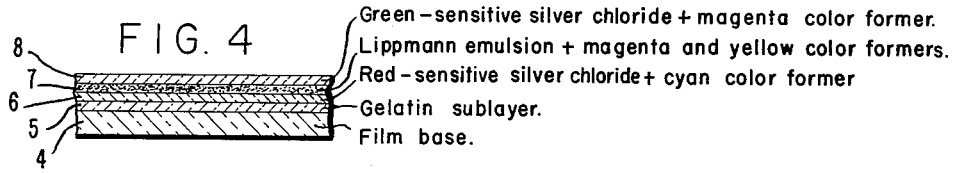
FIG. 4 is a schematic sectional view of the film of Example II.
Figure 5:
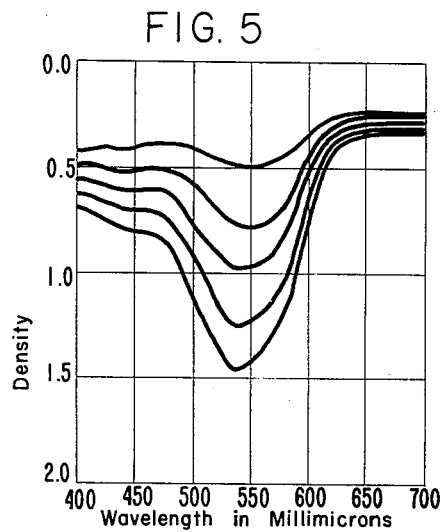
FIG. 5 is a graph containing spectrophotometric curves of the unmasked magenta image of the film of Example II.
Figure 6:
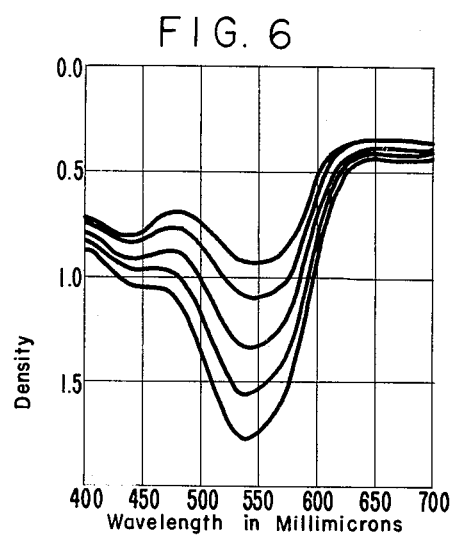
FIG. 6 is a graph containing spectrophotometric curves of the masked magenta dye image of the film of Example II.
Figure 7:
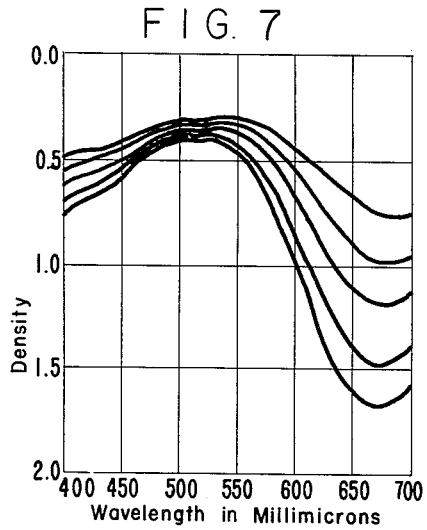
FIG. 7 is a graph containing spectrophotometric curves of the unmasked cyan dye image of the film of Example II.
Figure 8:
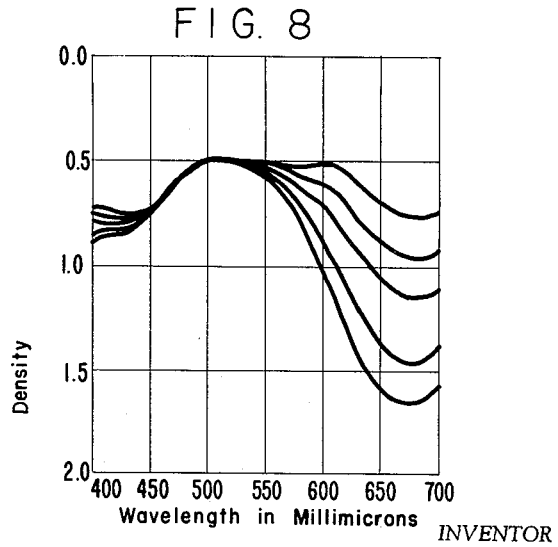
FIG. 8 is a graph containing spectrophotometric curves of the masked cyan dye image of the film of Example II.

A photographic film as shown in FIG. 4 comprises a transparent film base 5, a sublayer 5', a red sensitive, gelatino-silver chloride emulsion layer 6 sensitized between 620 and 720 m$\mu$ having a sensitivity maximum at 700 m$\mu$ and containing the cyan color former, m-(3-methyl salicylamido)benzaldehyde polyvinyl acetal, a Lippmann type gelatino-silver bromide emulsion masking layer 7 containing the magenta color former, 2-cyanoacetyl-3-phenyl-5-benzofuraldehyde polyvinyl acetal (U.S. Patent 2,680,732), and the yellow color former, m-benzoylacetamidobenzaldehyde polyvinyl acetal (U.S. Patent 2,464,597) and a green-sensitive gelatino-silver chloride emulsion layer 8 sensitive from 480 to 570 m$\mu$ with a sensitivity maximum at 560 m$\mu$ and containing as the magenta color former, an indazolone compound described in Jennen U.S. Patent 2,673,801. The Lippmann type emulsion was sensitized in the same manner as in Example I. The element was exposed in the color sensitometer described in Example I using for the red, Corning 2403 and 5120 filters and for the green, Corning 3486 and Jena BG–18 filters. The supplemental masking layer exposure during development was made through the support with a sodium vapor lamp (SLA–5C, George W. Gates Co.) having its primary emission lines at approximately 589 m$\mu$. FIGS. 6 and 8 show the spectrophotometric curves of the masked elements as compared to FIGS. 5 and 7 which show the curves of the unmasked magenta and cyan strips respectively.

*Example III*

The photographic film shown in FIG. 9 comprises a support 9, a red sensitive gelatino-silver chloride emulsion layer 10 sensitized as in Example II and containing the cyan color former, m-(3-methyl salicylamido)benzaldehyde polyvinyl acetal, a gelatino-silver bromide Lippmann emulsion masking layer 11 containing the magenta color former, 2-cyanoacetyl-3-phenyl-5-benzofuraldehyde polyvinyl acetal (U.S. Patent 2,680,732) and the yellow color former, m-benzoylacetamidobenzaldehyde polyvinyl acetal (U.S. Patent 2,464,597), and a green-sensitive gelatino-silver chloride layer 12 optically sensitized as in Examples I and II and containing the magenta color former used in layer 8 of Example II. The masking layer was not especially sensitized.

The element was exposed and processed in the same manner as Example I except that the supplemental masking exposure was made through the support with blue light covering a range from approximately 390 m$\mu$ to 500 m$\mu$. (Incandescent lamp filtered with Corning 5113 filter ½ thickness and Wratten 2B filter). It is to be noted that the spectrophotometric curves as shown in FIGS. 10 and 12 show a considerable amount of masking for the blue density of the magenta and essentially complete correction in certain regions for the blue and green densities of the cyan image. This compares with the unmasked images as shown by the curves in FIGS. 11 and 13.

*Example IV*

A photographic film as shown in FIG. 14 comprises a support 13, a red-sensitive gelatino-silver chloride emulsion layer 14 optically sensitized as in Example II and containing the cyan color former used in layer 10 of FIG. 9, a green-sensitive gelatino-silver chloride emulsion layer 15 optically sensitized as in Example I and containing the indazolone magenta color former of Example II, and a gelatino-silver bromide Lippmann emulsion masking layer 16 containing the magenta color former, 2-cyanoacetyl-3-phenyl-5-benzofuraldehyde polyvinyl acetal, and the yellow color former, m-benzoylacetamidobenzaldehyde polyvinyl acetal. The masking layer was optically sensitized from approximately 540 to 600 m$\mu$ with a sensitivity maximum at 590 m$\mu$.

The film was exposed and processed according to the manner of Example I. The supplemental exposure during processing was made through the support with the sodium vapor lamp described in Example II. From FIGS. 15 and 17 it is evident that good correction is obtained for the blue density of the magenta image and the blue and green densities of the cyan image when compared to the curves for the unmasked images shown in FIGS. 16 and 18.

*Example V*

The photographic film as shown in FIG. 19 comprises a support 17, a red-sensitive gelatino silver chloride emulsion layer 18 optically sensitized as in Example II and containing the cyan color former used in layer 15 of Example IV, a green-sensitive gelatino-silver chloride emulsion layer 19 optically sensitized as in Example I and containing the indazolone magenta color former of Example II, a gelatino-silver bromide Lippmann emulsion layer 20 containing the magenta and yellow color formers used in layer 16 of Example IV. The masking layer was not optically sensitized.

The photographic element was exposed and processed in the manner outlined in Example I except that the supplemental exposure was made through the support with blue light as described in Example III. The spectrophotometric curves shown in FIGS. 20 and 22 show a considerable amount of masking for the blue density of the magenta and essentially complete correction in certain regions for the blue and green densities of the cyan images as compared to the uncorrected images as represented by the curves of FIGS. 21 and 23.

In the film elements of FIGS. 9, 14 and 19 the gelatin sublayers normally present have been omitted from the drawing because the invention resides in the other layers and because such sublayers are generally used in all photographic films. Also, if desired, an antiabrasion layer can be coated onto the outermost silver halide layer of these elements, as well as the other elements described above.

Alternative photographic film elements which can be processed in manners similar to those set forth in the foregoing examples are, as stated above, disclosed in FIGS. 24, 25 and 26 of the drawings. The film element of FIG. 24, which consists of a hydrophobic film base 21, e.g., cellulose acetate or a vinylidene chloride copolymer coated polyethylene terephthalate film base as disclosed in Alles et al. U.S. Patent 2,627,088, is coated on one surface with a thin gelatin layer 1'. The opposite surface bears removable antihalation layer 22. On the gelatin sublayer there is coated, in order, a red-sensitive silver halide emulsion layer 23 containing a cyan color former as set forth in Example II, a gelatino silver bromide Lippmann emulsion layer 24 which is sensitized so that its maximum sensitivity is at about 590 m$\mu$ and containing the magenta and yellow color formers used in layers 16 of Example IV, a gelatino silver halide emulsion layer 25 which is sensitized to the green region of the spectrum and contains the magenta color former disclosed in Example II, a decolorizable yellow layer 26, and a blue-sensitive gelatino silver halide emulsion layer 27 containing the yellow color former m-benzoylacetamidobenzaldehyde polyvinyl alcohol acetal (U.S. Patent 2,464,597). The film just described can be color corrected by supplemental exposure during development by exposure from the emulsion side or the support side with a sodium vapor lamp. Layers 23 and 25 can be interchanged, if desired, or the color former and sensitivity relationship of such layers can be reversed, if desired.

The alternative film element shown in FIG. 25 consists of a film base 21 bearing on one surface a gelatin sublayer 1' and on the other an antihalation backing 22 as in FIG. 24. On the gelatin sublayer there is coated a red-sensitive gelatino silver chloride layer 28 containing the cyan color former set forth in Example I, a blue-sensitive silver halide emulsion layer 29 of the Lippmann type containing the magenta and yellow color formers used in layer 16 of Example IV, a green-sensitive silver chloride emulsion layer 30 containing a magenta color former as set forth in Example II, a decolorizable yellow filter layer 31 and a blue-sensitive silver halide emulsion layer 32 containing a yellow color former. The film of FIG. 25 can be exposed through the support during development to effect masking for the undesirable absorption of the dyes produced in the green- and red-sensitive layers. The yellow filter layer prevents the blue light masking exposure from exposing layer 32. Layers Nos. 28 and 30 can be interchanged, if desired, or the color former and sensitivity relationship of such layers can be reversed, if desired.

In the further alternative film of FIG. 26 a hydrophobic film base 21 is provided with an antihalation backing 22 and a gelatin sublayer 1' as described above. On the latter layer there is coated, in order, a blue-sensitive gelatino silver halide emulsion layer 33 containing a yellow color former, a gelatino silver chloride emulsion layer 34 which has its primary sensitivity at about 590 m$\mu$ containing a magenta and yellow color former as used in layer 16 of Example IV, a red-sensitive gelatino silver chloride emulsion layer 35 containing the cyan color former set forth in Example I and a green-sensitive silver chloride emulsion layer 36 containing the magenta color former as set forth in Example II. This film element can be color corrected by exposure from the emulsion side with a sodium vapor lamp during development. The layers can be rearranged and varied in sensitivity, if desired, as described in FIG. 25.

The proportion of magenta and yellow color formers can, of course, be varied over a fairly broad range. A sufficient amount of each is used so that an orange dye, which adequately corrects for the unwanted absorption of dye images in the primary color record layers, is formed in the masking layer. The use of such a mixture has advantages. For instance, varying the proportions of the magenta and yellow color formers permits corrections of various cyan color formers having different relative amounts of blue and green absorptions.

In place of the specific immobile or non-diffusing color formers described in the foregoing examples, which are essentially colorless compounds, various other color formers having such properties can be substituted in the foregoing examples and analogous procedures with similar results. In these color formers the color forming nucleus has as the active color-coupling group a structure which may be represented by the formula:

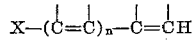

wherein X is HO— or a primary or secondary amine radical, e.g., RHN—, wherein R is hydrogen or an aliphatic group and n is 0 or 1. Compounds of this type include phenolic or naphtholic compounds and aromatic primary or secondary amines with hydrogen or replaceable groups, e.g., halogen, carboxyl and sulfonic acid groups para to the hydroxyl and active methylene compounds such as acylacetarylides, cyano-acetyl compounds, pyrazolones and other heterocyclic active methylene-containing compounds. While these are the preferred color formers, this invention works equally well with couplers and color developers that yield other types of dyes, for instance, the phenazonium and azine dyes as described in the following U.S. patents: Coles 2,524,725, Schmidt et al. 2,536,010 and 2,543,338, Tulagin et al. 2,524,741, 2,525,502, 2,525,503 and 2,591,642, and the dyes described in Jennen U.S. Patent 2,673,801.

Immobilization of these color formers in the emulsion layers may be accomplished in a number of ways. For instance, high molecular weight substituents including alkyl chains of 12 or more carbon atoms and polycyclic groups may be attached to the color formers to provide immobility in water-permeable colloid layers, as described in U.S. Patent 2,179,244 or the color formers may be immobilized by dispersing in a non-aqueous phase as shown in U.S. Patent 2,272,191. One particularly useful method of immobilization involves the formation of color forming polyvinyl acetals.

The preferred color formers are essentially colorless, synthetic polymers which have colloid properties and contain a plurality of aliphatic hydroxyl groups, usually vinyl alcohol units (—$CH_2$—CHOH— groups), in the polymer chain as the predominant hydrophilic group and have as an integral part of their molecular structure color former nuclei of the foregoing structure. They also preferably contain solubilizing groups from acetalization with an aldehyde containing such a group, e.g., —$SO_3Na$ and —$CO_2Na$. The general structure of these synthetic color forming, water permeable colloids may be represented as:

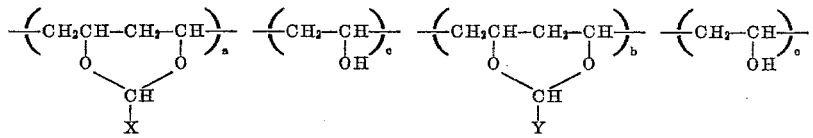

where X is a color former group or nucleus and Y is a group enhancing hydrophilic character, and the numbers a, b and c are selected to contribute the desired degree of colloid properties and to provide the required color density after color-coupling development. Such polymers are described in more detail in U.S. Patent 2,310,943 and in the J. Am. Chem. Soc. 73, 4930 (1951).

These color formers when used in light-sensitive silver halide layers may constitute the sole binding agents for the silver halide grains or they can be mixed with polyvinyl alcohol, polyvinyl acetals or partially hydrolyzed polyvinyl esters which are water-soluble or hydrophilic in character and/or other natural or synthetic colloid binding agents for silver halide grains, including gelatin.

Similarly, various other primary aromatic amino color-developing agents can be used in place of the specific one in the foregoing examples. Suitable additional ones are described in the British Journal of Photography, October 14, 1938, pages 647–648. These color-developing agents can be used in the form of their addition salts, e.g., hydrochlorides and hydrosulfates, which are more soluble and more stable than the free bases.

Various types of hydrophobic films can be used as the base film for the multilayer photographic elements described above. Suitable bases include cellulose derivatives, e.g., cellulose nitrate, cellulose acetate, cellulose acetate propionate, cellulose acetate butyrate; superpolymers, e.g., polyvinyl chloride, poly(vinyl chloride co vinyl acetate), and polyethylene terephthalate. The known anchoring sublayers which are useful with such bases can be used to anchor the silver halide emulsion layers to the bases.

Suitable antihalation materials include dyes, pigments and colloidal silver. In McQueen U.S. Patent 2,462,527 there are disclosed suitable antihalation layers.

The supplementary exposure is most simply carried out during color development. However, if desired, the development can be stopped by washing the film and drying, then giving the supplementary exposure and completing development and processing.

This invention may be applied to any multilayer color duplicating negative or master positive transparency from which copies, prints, duplicates, or other reproductions in color are to be made. Thus the color values in any multilayer color master positive, duplicating negative, or other intermediate film may be improved by use of this invention. Film elements of this invention cannot be used as camera negatives for exposing to original scenes.

In the film elements of the invention, the masking images apparently are produced by the modulation of the masking exposure by the dye and/or silver image of the record layer. Hence, the color correction is simple and direct.

Color correction also may be effected by means of interlayer development effects when the record layer/s to be corrected and the auxiliary masking layer are in contiguous relationship. Some color correction also may be effected by a reflex-type printing action.

An advantage of the use of the extremely fine grain emulsions of the Lippmann type is that being highly transparent these emulsions do not scatter light rays and so do not adversely affect the resolution or sharpness of the composite multilayer films. The novel multilayer films, as indicated in the examples, give especially good results when the auxiliary layer is exposed to wavelengths of light which do not expose the record layers and especially when exposed to light from a sodium vapor lamp.

An advantage of the multilayer films of this invention is that the auxiliary layers are more stable than those which are sensitive to infrared light.

An advantage of the invention is that it provides dependable film elements and processes for color correction by integral masking. By providing an auxiliary layer for receiving the color-correcting exposure, much better control of the sensitometric characteristics, i.e., speed and gamma, of the masking layer as well as the record layers, is attainable. This enables the technician to have more precise control over quality and degree of color correction. In other words, an advantage of the invention is that it provides new film structures and a method of processing which can be readily operated to yield multicolor images of nearly ideal color values.

The invention has the additional advantage in that it provides a practical and effective process for correcting the undesirable absorption of quinoneimine and azomethine dye images in the reproduction of original developed multi-color images.

What is claimed is:

1. A multilayer color photographic duplicating film comprising a transparent film base bearing three superposed light-sensitive silver halide primary color record layers and a yellow filter stratum contiguous with the outermost record layer, said record layers being so disposed and optically sensitized that the light-sensitive layers are essentially light-responsive in the blue, green and red color regions, respectively, of the visible spectrum, are substantially insensitive in a narrow region between the green and red regions of the spectrum and contain a non-diffusing organic color former containing a color-forming nucleus having as the active color-coupling group an atomic structure of the formula:

$$X-(\overset{|}{C}=\overset{|}{C})_n-\overset{|}{C}=\overset{|}{C}H$$

where X is a member taken from the group consisting of HO—, H$_2$N— and RHN— where R is an aliphatic group forming with HN— a secondary amino group, said color former being capable of forming, during development with a primary aromatic amine color developing agent, a subtractive dye essentially complementary in color to one of said primary colors, at least one such subtractive dye having unwanted absorption in another primary color region of the spectrum, and contiguous with at least one of said primary color record layers whose subtractive dye has unwanted absorption, at least one coactive Lippmann emulsion which is sensitive primarily in said narrow region between the green and red regions of the spectrum, having its maximum sensitivity at 590 m$\mu$ and is substantially insensitive in the remainder of the green and red regions of the spectrum, and which is so arranged in the multilayer element that upon exposure of said auxiliary layer said primary record layers are not exposed, said auxiliary layer containing non-diffusing yellow and magenta color formers of the aforesaid type so that the layer is capable upon development of silver halide of forming dye images having their principal absorptions in the regions of unwanted absorption of the dye in at least one record layer to be corrected.

2. A photographic film comprising a transparent film base having on one surface an anti-halation layer and in order on the opposite surface an anchor sublayer, a red-sensitive silver halide emulsion layer containing a cyan color former, a Lippmann emulsion which is sensitive primarily in a narrow region between the green and red regions of the spectrum, having its maximum sensitivity at 590 m$\mu$ and being substantially insensitive in the remainder of the green and red regions of the spectrum, and containing a mixture of magenta and yellow color formers, a green-sensitive silver halide emulsion layer containing a magenta color former, a yellow filter layer and a blue-sensitive silver halide emulsion layer containing a yellow color former, said red-sensitive, green-sensitive and blue-sensitive layers being substantially insensitive in said narrow region between the green and red regions, each said color former being a non-diffusing organic color former containing a color forming nucleus having as the active color-coupling group an atomic structure of the formula:

$$X-(\overset{|}{C}=\overset{|}{C})_n-\overset{|}{C}=\overset{|}{C}H$$

where X is a member taken from the group consisting of HO—, H$_2$N— and RHN— where R is an aliphatic group forming with HN— a secondary amino group, said color former being capable of forming, during development with a primary aromatic amine color developing agent, a subtractive dye essentially complementary in color to one of said primary colors.

3. A color film as set forth in claim 1 wherein the auxiliary silver halide emulsion is a chloride emulsion.

4. A process of color correction which comprises exposing a multilayer photographic color film as set forth in claim 1 to visible radiation from a multicolor image-bearing film, color developing said photographic color film to a substantial degree in a primary aromatic amine color developer solution to form silver images and subtractive dye images in the respective record layers of said color film, prior to completion of said color development and, before removing said film from said color developer solution to subsequent processing steps, exposing said film to a range of wave length of light to which the auxiliary layer is primarily sensitive, and which will not expose said record layers being corrected, completing said color development and forming a masking dye image from any color former in the auxiliary layer and removing the silver and silver salts from said element.

5. A process as set forth in claim 4 wherein said supplemental exposure is to light of wavelength about 590 m$\mu$.

References Cited in the file of this patent

UNITED STATES PATENTS

| | | |
|---|---|---|
| 2,258,187 | Mannes et al. | Oct. 7, 1941 |
| 2,316,803 | Michaelis | Apr. 20, 1943 |
| 2,348,735 | Gaspar | May 16, 1944 |
| 2,376,132 | Evans | May 15, 1945 |
| 2,927,019 | Woodward et al. | Mar. 1, 1960 |

FOREIGN PATENTS

| | | |
|---|---|---|
| 912,605 | France | Apr. 29, 1946 |
| 738,978 | Great Britain | Oct. 26, 1955 |
| 731,268 | Great Britain | June 8, 1955 |